Patented Aug. 5, 1941

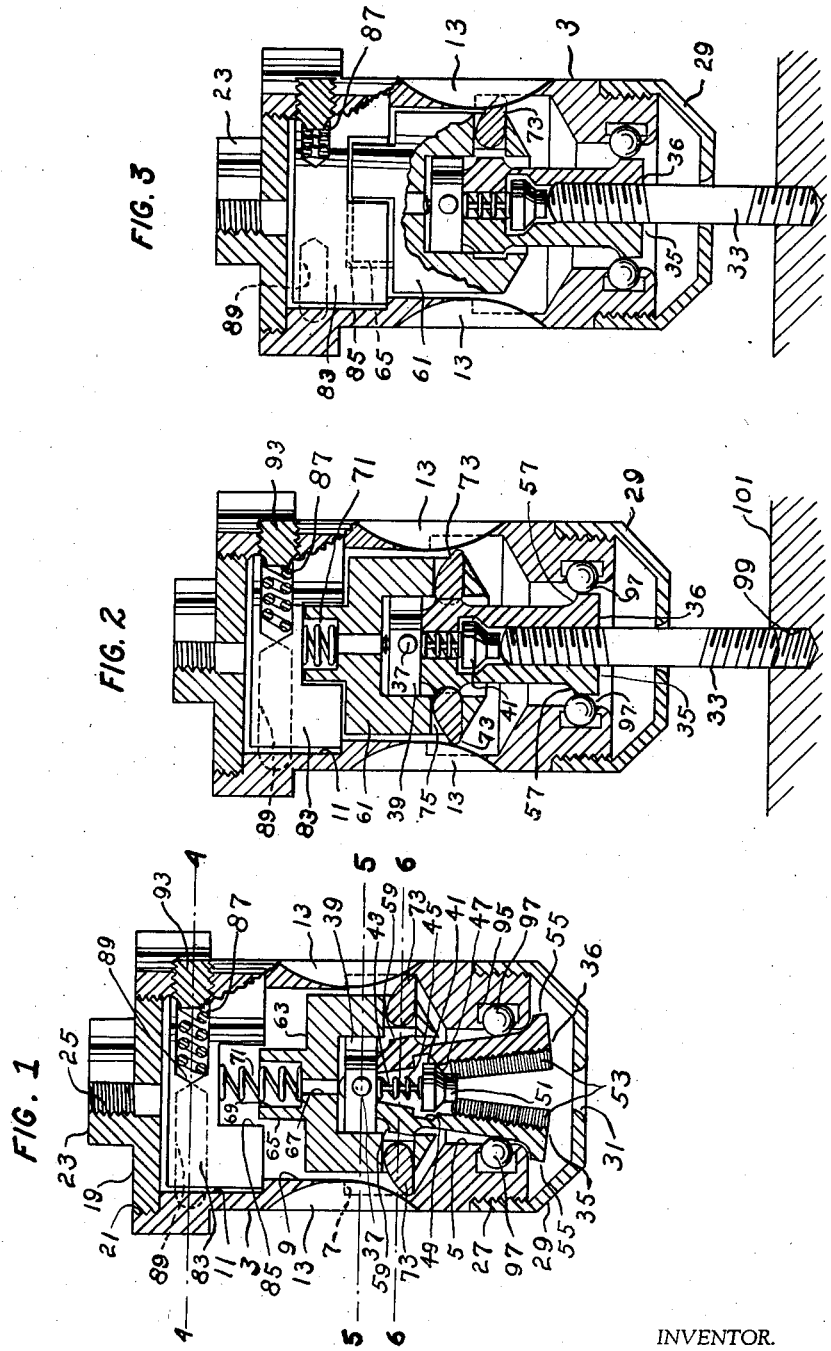

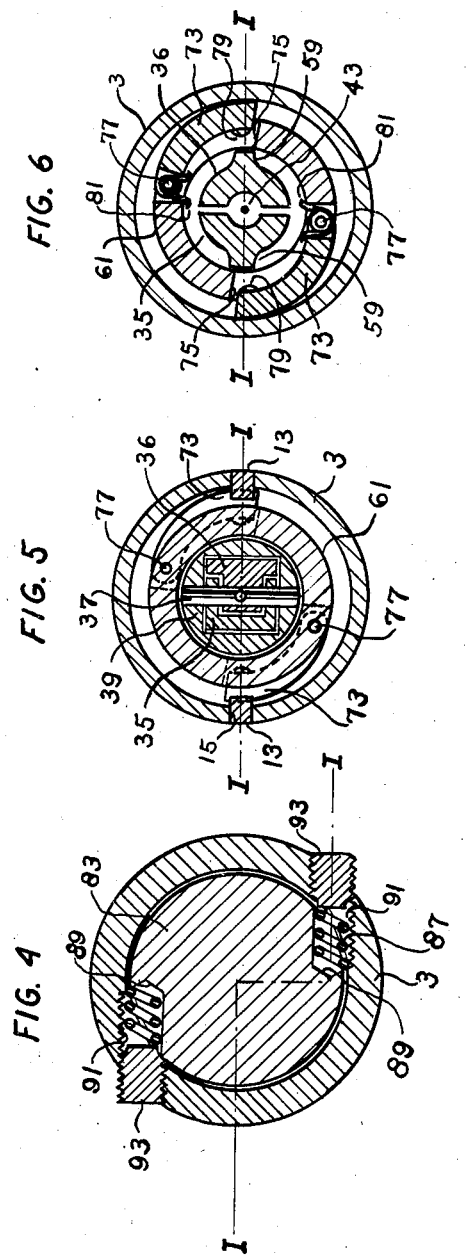

2,251,491

UNITED STATES PATENT OFFICE 2,251,491

AUTOMATIC STUD DRIVER

Cecil A. Lozen, Rochester, Mich.

Application June 3, 1939, Serial No. 277,235

5 Claims. (Cl. 81—112)

My invention pertains to automatic screw driving devices for driving threaded studs.

It is an object of my invention to provide an improved, automatic stud driver which is safe and which will not kick back and injure the operator when applied to threaded studs which are of uneven lengths or which have defective threads.

It is also an object of my invention to provide an improved stud driver which may be used for driving threaded studs of all different lengths and in any sequence, without adjustment.

It is a further object of my invention to provide such an improved stud driver of simple rugged construction which is safe and reliable in its operation and which releases automatically in response to a predetermined driving resistance encountered by the threaded stud, irrespective of the distance of the stud driver from the surface into which the threaded stud is driven.

It is also another object of my invention to provide an automatic screw stud driver comprising the combination of a head member adapted to be rotatably supported, screw stud engaging means carried by the head in a suitable position for engaging a stud to be driven, cam means carried by the head, latch support means carried by the head member in such a manner as to have movement axially and rotatably, the latching means being so arranged relative to the screw engaging means and the cam means that applied stud engaging pressure causes axial movement of the latching means to establish a driving connection to the screw engaging means, and rotatable movement of the latch support means caused by excessive driving force on the screw engaging means causes the established driving connection to be disconnected, and resilient means of suitable strength for opposing the rotative movement of said screw engaging means to drive a screw stud thereby engaged, to its properly seated position under normal conditions.

Further objects and advantages are within the scope of my invention, such as relate to the arrangement, and function of the related elements of the device, to various details of construction and to combinations of parts, and to economy of manufacture and numerous other features as will be apparent from a consideration of the specification in conjunction with the drawings, disclosing a specific embodiment of my invention in which:

Fig. 1 is a substantially central longitudinal sectional view, taken as shown by section lines 1—1 in Figs. 4, 5 and 6, and partially broken away, showing an automatic stud driver arranged in accordance with my invention, with the jaws in open disengaged position;

Fig. 2 is a similar view showing the stud driver applied to and driving a stud;

Fig. 3 is a similar view showing the stud driver just after the driving connection to the jaws has been automatically released; and Figs. 4, 5 and 6 are cross sectional views taken on lines 4—4; 5—5, and 6—6 respectively, as shown in Fig. 1.

Referring more particularly to Figs. 1, 2 and 3 of the drawings wherein like reference characters designate corresponding parts throughout, my improved automatic stud driving device comprises a head, the main element of which may be an enclosing casing or shell 3 of a substantially cylindrical shape having a bore 5 extending axially therethrough and providing a jaw receiving socket opening from the lower end. In the mid portion of the head shell 3 the lower bore 5 opens into a counter-bore 7 of substantially enlarged diameter, above which is a bore 9 of slightly smaller diameter, and at the upper end thereof a counter-bore 11 of greater diameter is provided, for a purpose to be subsequently described. At opposed diametrical points in the side-wall of the head casing, cams 13 are mounted at a suitable mid-position to present curved camming surfaces directed inwardly for operating latching means, in a manner to be described. For this purpose the cams 13 are disposed on the walls of the cylindrical head shell 3 parallel to the axis thereof as by insertion through suitably elongated slots 15, as shown in Fig. 5, where they may be secured, as by welding, for example.

The upper end of the head shell 3 is closed by a disk like head plate 19 the peripheral edge of which is threaded for attachment in an internally threaded annular groove 21 in the upper end of the head shell. The head disk 19 may be conveniently removed for assembling the internal mechanism of my stud driver, or for removing or replacing the parts of the inclosed mechanism. An annular boss 23 extends from the center of the upper side of the head disk 19 having an aperture 25 disposed in alignment with the axis of the head, and the aperture being internally threaded to provide a driving connection and support means by which the head may be mounted on the end of any arbor or motor shaft or other suitable driving means, as will be readily understood.

The lower end of the outer surface of the cylindrical head shell 3 is of a reduced diameter having an external thread 27 thereon for receiving a suitably threaded jaw retaining cap 29 which incloses the lower open end of the head shell, as shown. In the center of the lower wall of the jaw retaining cap 29 an aperture 31 is provided which is large enough in diameter to freely admit the screws or studs 33 which are to be driven by the device. The part of the device designated as the "head" consists of the supporting elements which are supported together and driven directly from the driving connection boss 23.

Stud engaging means is movably supported by the rotatable head of my stud driver comprising a pair of jaws 35 and 36 which are pivotally joined at their upper ends by a pivot pin 37 which passes diametrically through a ring 39. The upper ends of the jaws are reduced for insertion into the ring 39 and for free pivotal movement on the pin 37. For this purpose the upper end of one of the jaws 35 is made of a substantially U, or channel, cross section, and the other jaw 36 at the upper end is of a T shape fitting freely therein, as shown in Fig. 5, whereby the assembled upper ends of the jaws are together substantially square or rectangular in a cross section to fit into an aperture in the ring 39, which is of similar cross sectional shape. A spreading cam 41 is suspended between the two jaws 35 and 36 on the lower end of a small pin 43 which slides through an aperture in the jaw pivot pin 37. The cam 41, which is continuously biased downwardly by a compression spring 45 concentrically disposed on the slidable pin 43, is of a substantially circular cross section having a tapered or conical camming surface 47 on the lower side. The adjacent inner sides of the two pivoted jaws 35 and 36 have recesses 49 of suitable similar conformation for fitting around and inclosing the spreading cam 41, and the lower surfaces of the recesses are tapered to fit the lower tapered conical faces 47 thereof, whereby the downward pressure of the spring 45 causes the jaws to be normally pushed apart, when the device is not operating, as shown in Fig. 1. A contact 51 projects downwardly from the center of the spreader cam 41 for engagement by the end of screw 33 to lift the cam and permit the jaws to swing together, when the stud driver is operated.

The inner surfaces 53 between the lower ends of the jaws are of a suitable concave conformation and suitably threaded for clamping the inserted ends of the threaded studs 33 which are to be driven by the device. The lower ends of the jaws 35 and 36 are provided with laterally projecting flanges 55 which extend in outwardly opposed relation. The flanges 55 are of a suitable size with reference to the size of the opening in the lower open end of the head so that when the jaws are pushed up into the head, the flanges 55 cooperate with the open end of the head shell 3 to close the jaws together and to clamp the threaded stud 33 firmly therebetween. For moving the jaws together smoothly and firmly a curved or tapered surface 57 extends upwardly and inwardly from each flange 55 for smoothly engaging the walls of the head shell 3 around the lower end of the jaw receiving socket as the jaws are pushed upwardly therein by a threaded stud 33 to be driven. The walls of the head around the lower ends of the jaw receiving opening are rounded sufficiently to provide a smooth camming surface to cooperate with the curved or tapered surfaces 57 on the jaws with a minimum of friction, as the jaws are pushed up into the head. Latching projections 59 extend from the upper portions of the jaws 35 and 36 in outwardly opposed relation.

Adjacent the upper ends of the jaws I provide latch support means for carrying latching means which are relatively movable therein for actuation by engagement with the cams 13 on the head to be moved inwardly to latch the latching projections of the jaws firmly to the head to be driven therefrom, at a proper time after the jaws have been moved firmly to the jaw gripping position, in the manner previously described. The outer diameter of the latch sleeve 61 is suitable for sliding freely in the intermediate counterbore 9 in the head shell 3. The upper end of the cylindrical latch carrying sleeve 61 is closed by an end wall 63 which is provided with a protrusion 65 extending upwardly and passing transversely across the end wall. An aperture 67 passes axially through the upper end wall 63 of the latch sleeve in alignment with the end of the sliding pin 43 of the jaw assembly which passes freely thereinto when the jaws are pushed upwardly by a stud. The upper end of the aperture 67 opens into an enlarged counterbore 69 which comprises a socket for receiving the lower end of a spring 71 which tends to continuously bias the latch supporting sleeve 61 downwardly.

For carrying latches 73 for relative movement therein, the side walls of the latch sleeve are provided with slots 75 which pass therethrough in diametrically opposed relation. As shown in the cross sectional view in Fig. 6, the latches 73 are preferably elongated arms of arcuate conformation each of which is pivoted at one end on a pivot pin 77 and the other ends being free to swing through the slots 75 in the sleeve. The inside of the freely swinging end of each latch arm 73 is provided with a nub 79, each of which is adapted to engage the latching projection 59 on either one of the jaws 35 or 36 for locking the jaws to be driven from the head, when under predetermined conditions the outer surfaces of the free swinging ends of the latches are engaged and pressed inwardly by the cams 13 carried by the head. As shown in Fig. 6, each pivoted latch arm 72 is continuously biased outwardly by coil springs 81 one of which is disposed concentrically on each pivot pin 77 with one end engaging the pivoted arm and the other end anchored on the latch sleeve 61.

The upper end of the jaw receiving socket incloses a yieldable driving member 83 disposed in the enlarged counter-bore 11, between the driven end of the head 3 and the latch sleeve 61. The yieldable driving member 83 is in the form of a disk which is rotatably journalled in the enlarged counter-bore 11 the lower shoulder of which restrains the disk 83 from axial movement in the head. Extending transversely across the under side of the driving disk is a groove 85 of a suitable cross sectional size and shape to freely and slidably receive the transverse protrusion 65 from the latch sleeve 61 to provide a driving connection therebetween. The upper end of the compression spring 71 is seated in the transverse groove in the driving disk 83 and serves to continuously bias the latch sleeve 61 away from the driving disk. The driving disk is yieldingly driven from the head by means of compression driving springs 87 which are disposed in suitable spring receiving sockets 89 in the disk. For inserting the compression driving springs 87 after the driving disk 83 has been inserted into the head sleeve 61, apertures 91 are drilled through the side walls of the head sleeve in a direction substantially tangential to the peripheral surface of the driving disk. The spring receiving apertures are internally threaded to receive spring retaining screws or plugs 93 in the outer ends.

As viewed in Fig. 4, the springs react between the inner end of the spring receiving sockets 89 in the driving disk and the spring retaining screws 93 in the head sleeve to turn the driving disk clockwise relatively to the head to a predetermined normal operating position. This normal operating position may be limited by the inner ends of the screw retaining plugs 93 which are extended to provide stops for engaging the side of the spring sockets 89 in the driving disk. When driven stud 33 encounters a resistance greater than a predetermined force, as predetermined by a proper selection or adjustment of the driving springs 87, the springs are compressed toward the spring retaining plugs 93, as shown in Fig. 3 for example.

I have found it very important for the successful operation of my improved automatic stud driver, to reduce the friction to a minimum where the jaws 35 and 36 are engaged around the sides of the opening in the lower end of the head shell 3. To reduce friction I provide an annular race 95 in the side walls of the opening for receiving rolling friction reducing members 97 therein, which may be steel balls, as shown, or rollers or other friction reducing bearings may also be used, if desired.

Before operation, the elements of my automatic screw driving device are initially in the positions, as shown in Fig. 1, the jaws being released from the head. In Fig. 2, the stud driving device is shown as it is moved downwardly on the threaded stud 33 which is to be screwed into a suitably threaded aperture 99 in a body 101. As this operation was performed, the upper end of the stud 33 engaged the contact 51 lifting the spreading cam 41 and permitting the pivoted jaws 35 and 36 to swing together to clamp the stud.

As the jaws are pushed upwardly into the head, engagement with the lower open end of the head sleeve and the ball bearings clamps the jaws forcefully together to firmly clamp the stud, which operation is still further aided by the thread in the stud. In the final uppermost position of the jaws the flanges engage the ball bearings in the open lower end of the head sleeve which continue to hold the jaws clamped on the stud. As the jaws are pushed up into the jaw receiving socket in the head sleeve, the upper ends of the jaws push the latch sleeve 61 upwardly and carry the free ends of the pivoted latch arms 73 against the cams 13 carried by the head. This operation causes the free ends of the latches 73 to swing inwardly and engage the latching projections on the jaws 35 and 36 which are then locked to rotate with the latch sleeve 61. Driving force is now applied from the head through the driving springs 87 to the driving disk 83 in the upper portion of the head, thence through the transverse driving protrusion 65 to the latch sleeve 61 and thence through the latch arms 73 to the jaws 35 and 36 which drive the threaded stud 33 into the block.

When a greater than normal resistance is encountered by the threaded stud 33, the driving springs 87 yield permitting an angular movement of the driving disk 83 and of the connected latch sleeve 61 which movement is sufficient to carry the latching arms 73 angularly away from the actuating cams 13 in the head sleeve. This operation takes place when the driving force becomes excessive and irrespective of the position of the lower wall of the jaw retaining cover 29 above the block 101. And as soon as this cooperation occurs, the pivoted latch arms swing outwardly again, as shown in Fig. 3, the driving connection to the jaws 35 and 36 is interrupted, the jaws become stationary with the stud and the head rotates freely around the jaws, the friction being reduced to a minimum by the ball bearings in the open lower end of the head.

The stud driver is then free and it may be pulled freely from the stud. The jaws are then pushed downwardly by the compression spring, spreading apart as shown in Fig. 1, and the automatic stud driver is set for the next stud to be driven irrespective of the length thereof. Any number of studs of different lengths may be quickly driven and in any sequence without manually adjusting or resetting the stud driver in any way, the release is sure and positive irrespective of the length of the studs and there is no danger of the operator being injured because of studs of varying lengths or because of defective threads or because of an object of any kind accidently becoming lodged in a threaded aperture 99 in the block 93.

It is apparent that within the scope of my invention, modifications and different arrangements may be made other than herein disclosed, and the present disclosure is illustrated merely, the invention comprehending all variations thereof.

I claim:

1. In a screw driving device the combination of, a head having driving connection support means at one end and a jaw receiving socket opening from the other end, separable jaws movable axially and rotatable in said socket and closed by the open end of the socket when pushed thereinto, a latch sleeve disposed in said jaw receiving socket adjacent the inner ends of said jaws, said latch sleeve being arranged for axial and rotative movement in the jaw receiving socket, resilient means for projecting said latch sleeve toward the open end of the jaw receiving socket, latching means movably carried in the side-walls of said latch sleeve for latching the jaws to prevent rotative movement of the jaws relative to the latch sleeve, cam means projecting inwardly from the side-walls of the jaw receiving socket in a predetermined position for actuating said latching means to jaw latching position when the jaws and the latch sleeve have been pushed a predetermined distance into said socket, yieldable driving means in said socket for rotatably driving said latch sleeve to rotate with the head in variable angular positions therein according to the driving resistance encountered by said jaws and said yieldable driving means being so selected or adjusted that when a driving resistance is encountered by the jaws greater than required the latch sleeve turns sufficiently in said socket to carry the latching means away from said cam means for releasing the jaws from driving connection.

2. A screw driving device comprising the combination of, a head member adapted to be rotatably supported, screw engaging means carried by said head member, cam means on said head, latching means supported by said head in such a manner as to have movement axially and rotatably relative thereto, said latching means being so disposed relative to said cam means and said screw engaging means that applied screw engaging pressure causes axial movement of the latching means to establish a driving connection between the head and the screw engaging means and rotatable movement caused by excessive driving force on the screw engaging means causes the established driving connection to be disconnected, and resilient means of suitable resilient strength for opposing the rotative movement of said screw engaging means to drive a screw thereby engaged.

3. In a screw driving device the combination of, a head having driving connection support means at one end and a jaw receiving socket opening from the other end, separable jaws movable axially and rotatable in said socket and closed by the open end of the socket when pushed thereinto, a latch support disposed in said jaw receiving socket adjacent the inner ends of said jaws, said latch support being arranged for axial and rotative movement in the jaw receiving socket, resilient means for projecting said latch support toward the open end of the jaw receiving socket, latching means movably carried in said latch support for latching the jaws to prevent rotative movement of the jaws relative to the latch support, cam means projecting inwardly from the side-walls of the jaw receiving socket in a predetermined position for actuating said latching means to jaw latching position when the jaws and the latch support have been pushed a predetermined distance into said socket, a driving member disposed in said jaw receiving socket between the latch support and the driven end of the head, bearing means arranged for rotatably journalling said driving member and restraining it from axial movement, a transverse recess in the side of said driving member adjacent the latch support, a transverse protrusion extending from the latch support slidably into said transverse recess whereby the latch support is rotatably driven from the driving member while having freedom for axial movement, resilient means disposed between said driving member and said latch support for biasing said support away from said member, yieldable driving means in said socket for rotatably driving said latch support to rotate with the head in variable angular positions therein according to the driving resistance encountered by said jaws, and said yieldable driving means being so selected or adjusted that when a driving resistance is encountered by the jaws greater than required the latch support turns sufficiently in said socket to carry the latching means away from said cam means to release the jaws from driving connection.

4. A screw driving device comprising, screw engaging means, a sleeve of a generally cylindrical conformation surrounding one end of said screw engaging means, a driving head having a hollow shell portion enclosing said sleeve, resilient driving means for driving said sleeve from said driving head at various angular positions relative thereto in accordance with variable torque resistance encountered by the screw engaging means, and means actuated by movement of the screw engaging means and the sleeve axially into the head for establishing driving connection therebetween and releasable by a predetermined angular rotation of the screw engaging means and the sleeve relative to the head in response to torque resistance.

5. A screw driving device comprising the combination of, a head driving member adapted to be rotatably supported, screw engaging means carried by said head member, cam means on the driving head, a sleeve supported by said driving head with the sidewalls of the sleeve disposed between the driving head and the inner end of the screw engaging means, apertures in the side walls of said sleeve, latch members movably disposed in said apertures for establishing driving connection with the screw engaging means, resilient driving means between said sleeve and said driving head for driving said sleeve at various angular positions relative thereto in accordance with the various resistances encountered by said screw driving means, and said cam means and the latch members being arranged for establishing driving connection to the screw driving means in predetermined angular positions of the sleeve when pushed axially into the head and to disconnect the driving connection when the sleeve is turned more than a predetermined angular amount relative to the driving head.

CECIL A. LOZEN.